United States Patent
Jennas, II et al.

(10) Patent No.: US 9,497,175 B2
(45) Date of Patent: *Nov. 15, 2016

(54) ITERATIVE DATA SECRET-SHARING TRANSFORMATION

(71) Applicant: International Business Machines Corporation, Armonk, NY (US)

(72) Inventors: Paul A. Jennas, II, Tucson, AZ (US); Jason L. Peipelman, Vail, AZ (US); Joshua M. Rhoades, Apex, NC (US); Matthew J. Ward, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,913

(22) Filed: May 6, 2015

(65) Prior Publication Data

US 2015/0237024 A1    Aug. 20, 2015

Related U.S. Application Data

(63) Continuation of application No. 12/780,732, filed on May 14, 2010, now Pat. No. 9,124,423.

(51) Int. Cl.
*H04L 9/08* (2006.01)
*H04L 29/06* (2006.01)
*H04L 9/06* (2006.01)

(52) U.S. Cl.
CPC .......... *H04L 63/0485* (2013.01); *H04L 9/065* (2013.01); *H04L 9/085* (2013.01); *H04L 2209/34* (2013.01)

(58) Field of Classification Search
CPC .................................................... H04L 9/085
See application file for complete search history.

(56) References Cited

U.S. PATENT DOCUMENTS 5,485,474 A * 1/1996 Rabin ................. G06F 11/004
                                                                714/762
5,708,714 A * 1/1998 Lopez ..................... H04L 9/085
                                                                380/286

(Continued)

OTHER PUBLICATIONS

Jun Kurihara, Shinsaku Kiyomoto, Kazuhide Fukushima and Toshiaka, "A new (k,n)-Threshold secret sharing scheme and its extension" ISC 2008, LNCS 5222, pp. 455-470, 2008.*

(Continued)

*Primary Examiner* — Dede Zecher
*Assistant Examiner* — Jason C Chiang
(74) *Attorney, Agent, or Firm* — William K. Konrad; Konrad Raynes Davda & Victor LLP

(57) ABSTRACT

Provided are a method, system, and article of manufacture for iterative data secret-sharing transformation and reconversion. In one aspect, data secret-sharing transformation and reconversion is provided in which each bit of an input stream of bits of data is split, on a bit by bit basis, into a pair of secret-sharing bits, and the secret-sharing bits of each pair of secret-sharing bits are separated into separate streams of secret-sharing bits. In this manner, one secret-sharing bit of each pair of secret-sharing bits may be placed in one stream of secret-sharing bits and the other secret-sharing bit of each pair may be placed in another stream of secret-sharing bits different from the one stream of secret-sharing bits. Confidentiality of the original input stream may be protected in the event one but not both streams of secret-sharing bits is obtained by unauthorized personnel. In another aspect, for an input stream of N bits, each received bit of the N bits of the input stream of data, may be interatively split, on a bit by bit basis, into a pair of secret-sharing bits, to generate as few as N+1 secret-sharing bits from the input stream of bits N bits. Other features and aspects may be realized, depending upon the particular application.

18 Claims, 7 Drawing Sheets

(56) References Cited

U.S. PATENT DOCUMENTS

| | | | |
|---|---|---|---|
| 5,889,935 A | | 3/1999 | Ofek et al. |
| 6,484,315 B1 | | 11/2002 | Ziese |
| 6,530,035 B1 | | 3/2003 | Bridge |
| 6,792,546 B1 | | 9/2004 | Shanklin et al. |
| 7,203,892 B2 | | 4/2007 | Corbett et al. |
| 7,231,412 B2 | | 6/2007 | Hitz et al. |
| 8,050,410 B2 | * | 11/2011 | Sanders ............... H04L 9/0852 380/263 |
| 8,074,068 B2 | * | 12/2011 | Fujii ..................... H04L 9/085 380/212 |
| 8,077,863 B2 | * | 12/2011 | Hosaka ................. H04L 9/085 380/212 |
| 8,085,938 B2 | * | 12/2011 | Kagaya ............... G06Q 20/382 380/277 |
| 8,135,130 B2 | * | 3/2012 | Nonaka ................ H04L 9/0618 380/265 |
| 2004/0225705 A1 | * | 11/2004 | Rumynin ............... G06F 7/5336 708/620 |
| 2007/0192864 A1 | | 8/2007 | Bryant et al. |
| 2008/0133967 A1 | | 6/2008 | Lee et al. |
| 2008/0205637 A1 | * | 8/2008 | Kurihara ................ H04L 9/085 380/28 |
| 2008/0232580 A1 | | 9/2008 | Hosaka et al. |
| 2009/0161870 A1 | * | 6/2009 | Rosenberg ........... G06F 21/6218 380/268 |
| 2009/0177894 A1 | * | 7/2009 | Orsini ................. G06F 21/6209 713/193 |
| 2009/0232043 A1 | * | 9/2009 | Wu .................... H04B 7/15521 370/312 |
| 2011/0022717 A1 | * | 1/2011 | Nagai .................... H04L 47/10 709/231 |
| 2011/0280404 A1 | | 11/2011 | Jennas et al. |

OTHER PUBLICATIONS

M.P. Herlihy, et al., "How to Make Replicated Data Secure", IP.com, Technical Disclosure, IP.com No. IPCOM000148162D, Aug. 31, 1987, pp. 1-13.

D.A. Patterson, et al., "A Case for Redundant Arrays of Inexpensive Disks (RAID)", ACM, 1988, pp. 109-116.

"LaCie Big Disk Recovery", Data Recovery Blog, [online] [retrieved Nov. 4, 2009] file:///CI/Documents%20and%20Settings/Administrator/My%20Docu...
aCie%20Blg%20Disk%20*%20Data%20Recovery%20BLog.htm, pp. 1-3.

English Abstract of Japanese Publication No. JP03271847 A, entitled "Semiconductor Disk Device", published Mar. 12, 1991 for Applicant Fujitsu Ltd.

English Abstract of Japanese Publication No. JP05290515 A, entitled "Disk Device", published May 11, 1993 for Applicant Canon Inc.

English machine translation of Japanese Publication No. JP05290515, entitled "Disk Device", published May 11, 1993 for Applicant Canon Inc.

J. Kurihara, et al., "A New (k,n)-Threshold Secret Sharing Scheme and Its Extension", ISC 2008, LNCS 5222, pp. 455-470, 2008.

Office Action dated Aug. 15, 2012, pp. 22, for U.S. Appl. No. 12/780,732, filed May 14, 2010.

Response dated Dec. 17, 2012, pp. 12, to Office Action dated Aug. 15, 2012, pp. 22, for U.S. Appl. No. 12/780,732, filed May 14, 2010.

Final Office Action dated Feb. 26, 2013, pp. 23, for U.S. Appl. No. 12/780,732, filed May 14, 2010.

Response dated May 28, 2013, pp. 14, to Final Office Action dated Feb. 26, 2013, pp. 23, for U.S. Appl. No. 12/780,732, filed May 14, 2010.

Office Action dated Jul. 29, 2013, pp. 21, for U.S. Appl. No. 12/780,732, filed May 14, 2010.

Response dated Oct. 29, 2013, pp. 14, to Office Action dated Jul. 29, 2013, pp. 21, foe U.S. Appl. No. 12/780,732, filed May 14, 2010.

Final Office Action2 dated Jan. 24, 2014, pp. 21, for U.S. Appl. No. 12/780,732, filed May 14, 2010.

Response dated Apr. 24, 2014, pp. 12, to Final Office Action2 dated Jan. 24, 2014, pp. 21, for U.S. Appl. No. 12/780,732, filed May 14, 2010.

RCE Amendment dated May 27, 2014, pp. 12, to Final Office Action2 dated Jan. 24, 2014, pp. 21, for U.S. Appl. No. 12/780,732, filed May 14, 2010.

Office Action dated Oct. 3, 2014, pp. 24, for U.S. Appl. No. 12/780,732, filed May 14, 2010.

Response dated Jan. 5, 2015, pp. 18, to Office Action dated Oct. 3, 2014, pp. 24, for U.S. Appl. No. 12/780,732, filed May 14, 2010.

Notice of Allowance dated Apr. 22, 2015, pp. 20, for U.S. Appl. No. 12/780,732, filed May 14, 2010.

* cited by examiner

PRIOR
ART

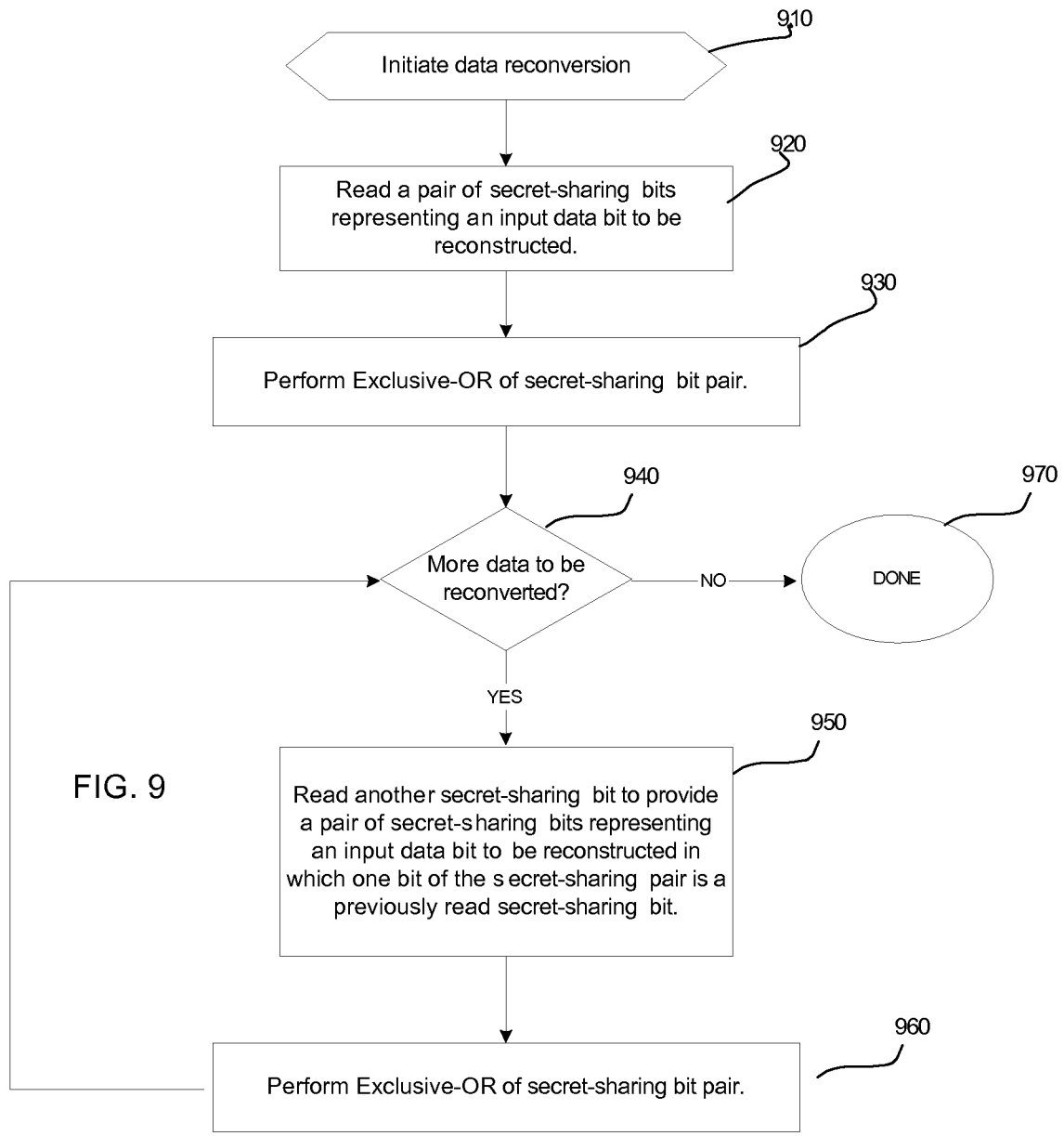

ITERATIVE DATA SECRET-SHARING TRANSFORMATION

BACKGROUND

1. Field

The present description relates to a method, system, and article of manufacture for iterative data secret-sharing transformation.

2. Description of Related Art

Encryption may be used to protect confidentiality of data during transmission of that data over the Internet or other public transmission carriers. Encryption is also often used in data storage to protect confidentiality of the stored information. For example, stored data may need to be protected in order to meet various government standards. Also, storage media may be removed from a storage system for servicing. Thus, if removed media is lost or otherwise is obtained by unauthorized personnel, the confidentiality of the data on the media may be compromised.

In one aspect, encryption is a process of transforming information using an algorithm to make it unreadable, that is, not understandable, to anyone except those possessing special knowledge. One example of such special knowledge is often referred to as a "key" which can be used to decrypt the information so that the information is understandable again. Thus, if the key is lost, the encrypted data may be irretrievably lost. If the key is obtained by unauthorized personnel, the confidentiality of the encrypted data may be compromised.

Other approaches include encrypting data at the host level or at the host adapter level before storing the encrypted data on the storage drives. In certain computing environments, multiple host systems may communicate through one or more host adapters with a storage control unit or controller which provides access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc.

Other techniques for protecting confidentiality of information include secret sharing algorithms in which data is split into multiple parts. In order to reconstruct the data, typically more than one of the parts must be accessed. One such secret sharing algorithm is known as Shamir's Secret in which a complete set of input data is processed at one time to create the separate parts.

Another technique for protecting confidentiality of data includes "obfuscation" in which an algorithm is applied to a set of data to "obfuscate" or hide the data. If the algorithm is known, the original data may be reconstructed from the obfuscated data.

One known type of storage controller is a Redundant Array of Independent Disks (RAID) controller which receives data to be written to storage. The RAID controller typically stripes the data for an addressable block, such as a logical block address (LBA), tracks, etc., to multiple disk drives, calculates checksum blocks for the data, and writes the checksum blocks to a separate disk. Data or checksum blocks written to each disk in a RAID rank are referred to as a stripe or stride, where a stripe comprises the consecutive sectors written to a single disk in the rank of storage devices across which data and checksum information are written. RAID schemes, such as RAID levels 1, 2, 3, 4, 5, 10 [0+1, 1+0], provide a single level of redundant protection and are tolerant of a single device failure prior to being exposed to data loss from an additional failure. Single error correction codes such as used in RAID3, RAID4 and RAID5 provide the capability to correct for an erasure when the location of the data error can be pinpointed by some independent means. For hard disk drives, the error often may be pinpointed and corrected because the disk does not respond or other checkers (checksum, CRCs, LRCs, etc) on the disk may facilitate location of the source of the data error independent of the RAID checksum. RAID 6 provides an additional checksum block, or RAID checksum code, that can be used to pinpoint the location of and correct for a single symbol error or multiple failures, such as double disk failures. RAID 6 may utilize Reed-Solomon (R-S) codes comprised of symbols calculated from polynomials.

SUMMARY

In one aspect of the present description data secret-sharing transformation is provided in which each bit of an input stream of bits of data is split, on a bit by bit basis, into a pair of secret-sharing bits, and the secret-sharing bits of each pair of secret-sharing bits are separated into separate streams of secret-sharing bits. In this manner, one secret-sharing bit of each pair of secret-sharing bits may be placed in one stream of secret-sharing bits and the other secret-sharing bit of each pair may be placed in another stream of secret-sharing bits different from the one stream of secret-sharing bits. Confidentiality of the original input stream may be protected in the event one but not both streams of secret-sharing bits is obtained by unauthorized personnel.

In one application, one stream of secret-sharing bits of data may be stored on a first storage medium at a first location, and the other stream of secret-sharing bits of data may be stored on a second storage medium at a second location separated from said first location. Confidentiality of the original input stream may be protected in the event one but not both storage media is obtained by unauthorized personnel.

In another application, one stream of secret-sharing bits may be transmitted in a first communication channel, and the other stream of secret-sharing bits of data may be transmitted in a second communication channel separated from the first communication channel. Confidentiality of the original input stream may be protected in the event one but not both communication channels is intercepted by unauthorized personnel.

In the illustrated embodiment, the splitting of each bit of an input stream of bits of data, into a pair of secret-sharing bits, is a function of the exclusive-OR function. More specifically, in one embodiment, each received bit of the input stream of bits of data is equal to the exclusive-OR function of the associated pair of secret-sharing bits.

In another aspect, reconversion is provided in which received streams of secret-sharing bits may be restored as a reconstructed stream of bits of data. In one embodiment, one stream of secret-sharing bits is recombined with the other stream of secret-sharing bits of data, on a bit by bit basis. More specifically, in one embodiment, each recombined bit of the restored stream of bits of data is equal to the exclusive-OR function of an associated pair of secret-sharing bits, one secret-sharing bit from the one stream of secret-sharing bits, and the other secret-sharing bit from the other stream of secret-sharing bits.

In another aspect, for an input stream of N bits, each received bit of the N bits of the input stream of data, may be iteratively split, on a bit by bit basis, into a pair of secret-sharing bits, to generate as few as N+1 secret-sharing bits from the input stream of bits N bits.

Other features and aspects may be realized, depending upon the particular application.

BRIEF DESCRIPTION OF THE DRAWINGS

FIG. 9 illustrated a more detailed example of operations to reconvert streams of secret-sharing bits, on a bit by bit, iterative, basis, in accordance with an aspect of the present description.

DETAILED DESCRIPTION

Figure 1:
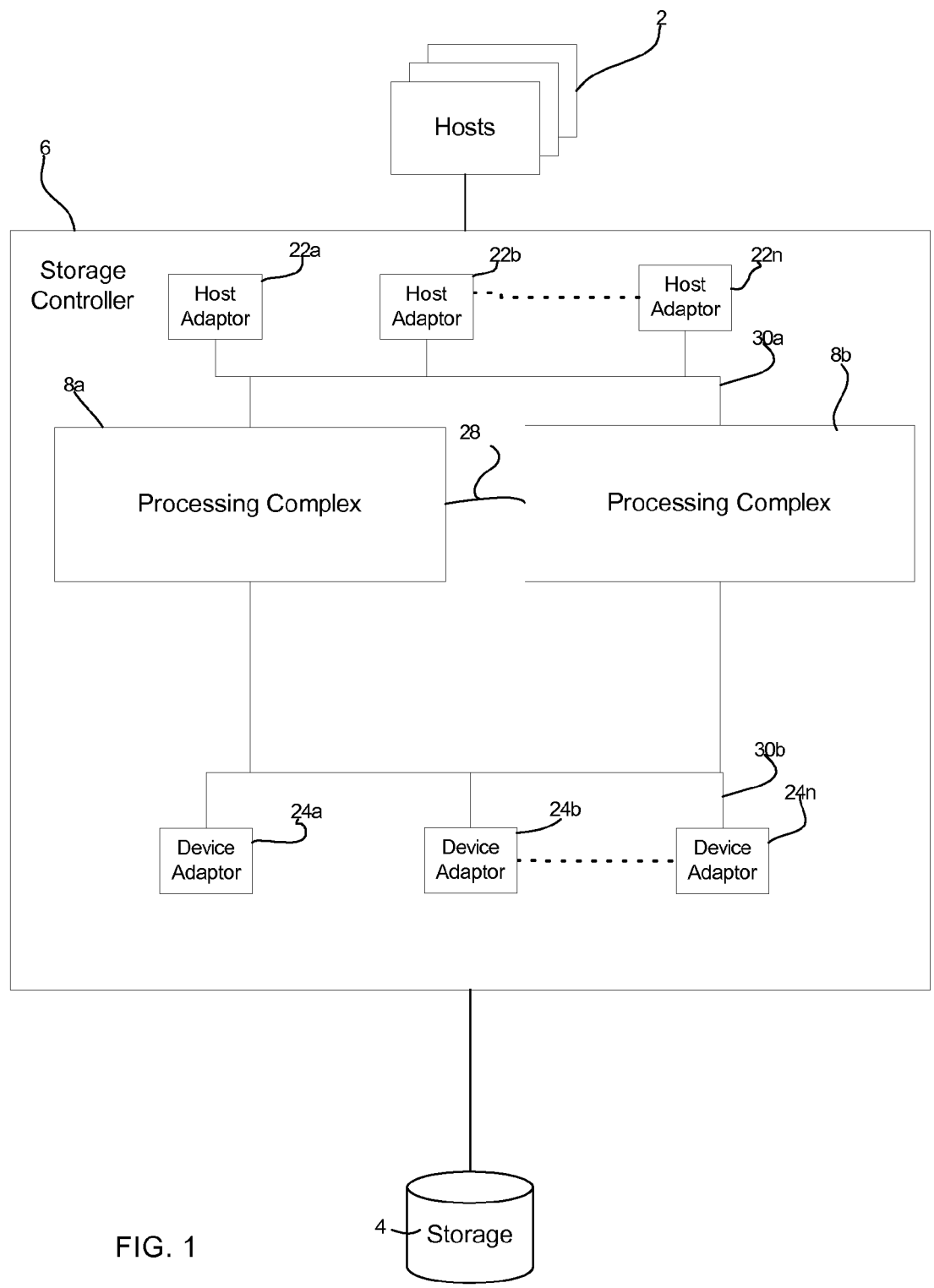
FIG. 1 illustrates an embodiment of a computing environment in which an aspect of the present description may be employed.

FIG. 1 illustrates one example of a computing environment in which aspects of the present description may be employed. One or more hosts 2 communicate Input/Output (I/O) tasks or other processing requests directed to a storage 4, through a storage cluster or controller 6, where the storage controller 6 manages access to the storage system 4. In one embodiment, the storage controller 6 includes two or more processing nodes or complexes 8a, 8b, each including a processor and a memory. Each processor can include one or more central processing units (CPUs) available as processing resources to the associated processing complex 8a, 8b.

Each processing complex 8a, 8b may have one or more logical partitions executing in the processing complexes 8a, 8b. Each logical partition separately executes an operating system and device. The logical partitions comprise a division of the processors into logical independent processing systems each having their own operating systems and device drivers. Multiple logical partitions may execute in each processing complex, managed by a supervisor module for that complex.

Each device driver provides an interface between the operating system in the logical partition in which the device driver executes, and an external device, such as host adaptors 22a, 22b . . . 22n and device adaptors 24a, 24b . . . 24n. The host adaptors 22a, 22b . . . 22n enable the processing complexes 8a, 8b to communicate with the hosts 2 and the device adaptors 24a, 24b . . . 24n enable the processing complexes 8a, 8b to communicate with the storage 4. Thus, the processing complexes 8a, 8b share devices, such as adaptors 22a, 22b . . . 22n, 24a, 24b . . . 24n. The variable "n" is used to denote an integer instance of an element, and may indicate different or the same integer value when used with different elements. For instance, 22n and 24n may indicate a same or different number of host adaptors 22n and device adaptors 24n.

The processing complexes 8a, 8b communicate with the host adaptors 22a, 22b . . . 22n over a fabric 30a and the device adaptors 24a, 24b . . . 24n over a fabric 30b. The fabrics 30a, 30b may comprise one or more interfaces providing communication paths between the processing complexes 8a, 8b and adaptors. A path comprises the hardware in the fabrics 30a, 30b that enables communication with shared adaptors over the fabric. In one embodiment, the fabric may comprise a Fibre Channel arbitrated loop configuration, a serial loop architecture or a bus interface, such as a Peripheral Component Interconnect (PCI) interface. Each processing complex 8a, 8b may be assigned a portion of the adaptors 22a, 22b . . . 22n, 24a, 24b . . . 24n and during initialization.

The processing complexes 8a, 8b may be assigned to handle I/O requests directed to specific volumes configured in the storage 4. The processing complexes 8a, 8b communicate with the storage system 4, via the device adaptors 24a, 24b . . . 24n, over a device network (not shown), which may comprise a local area network (LAN), storage area network (SAN), bus interface, serial interface, etc. Further, the processing complexes 8a, 8b communicate over a connection 28 enabling processor inter-communication to manage configuring operations performed with respect to the shared devices, such as the shared adaptors 22a, 22b . . . 22n, 24a, 24b . . . 24n. In alternative embodiments, there may be only one fabric connecting all adaptors 22a, 22b . . . 24n, 24a, 24b . . . 24n, i.e., fabrics 30a and 30b may be part of a single interconnected fabric, or two fabrics, such as shown 30a and 30b, or more than two fabrics.

The storage controller 6 may comprise any type of server, such as an enterprise storage server, storage controller, etc., or other device used to manage I/O requests to attached storage 4, where the storage may comprise one or more storage devices known in the art, such as interconnected hard disk drives (e.g., configured as a DASD, RAID, JBOD, etc.), magnetic tape, electronic memory, etc. The hosts 2 may communicate with the cluster 6, via the adaptors 22a, 22b . . . 22n, over a network (not shown), such as a Local Area Network (LAN), Storage Area Network (SAN), Wide Area Network (WAN), wireless network, etc. Alternatively, the hosts 2 may communicate with the storage controller 6 over a bus interface, such as a Peripheral Component Interconnect (PCI) bus or serial interface. It is further appreciated that the storage controller 6 may also be, for example, a generic server cluster, not just a storage subsystem or storage controller. For example, the two servers could be IBM pSeries servers running a highly available cluster application such as Lotus Notes®.

In one aspect of the present description, data being stored may be secret-sharing transformed at the RAID level. As a result, secret-sharing transformation may be implemented utilizing a RAID type architecture in a storage controller. However, it is appreciated that other storage controller architectures may be utilized as well. It is further appreciated that secret-sharing transformation may be implemented at other levels such as at the host, host adapter or storage adapter level, for example. As explained in greater detail below, a secret-sharing transformation scheme in accordance with the present description can facilitate maintenance of confidentiality in the event a storage drive is accessed by unauthorized personnel. Other aspects may be realized, depending upon the particular application.

As used herein, the term "secret-sharing transformation" includes secret sharing processes in which data is split into multiple parts for protecting confidentiality whether or not keys are used to encrypt the data.

Figures 2, 3:
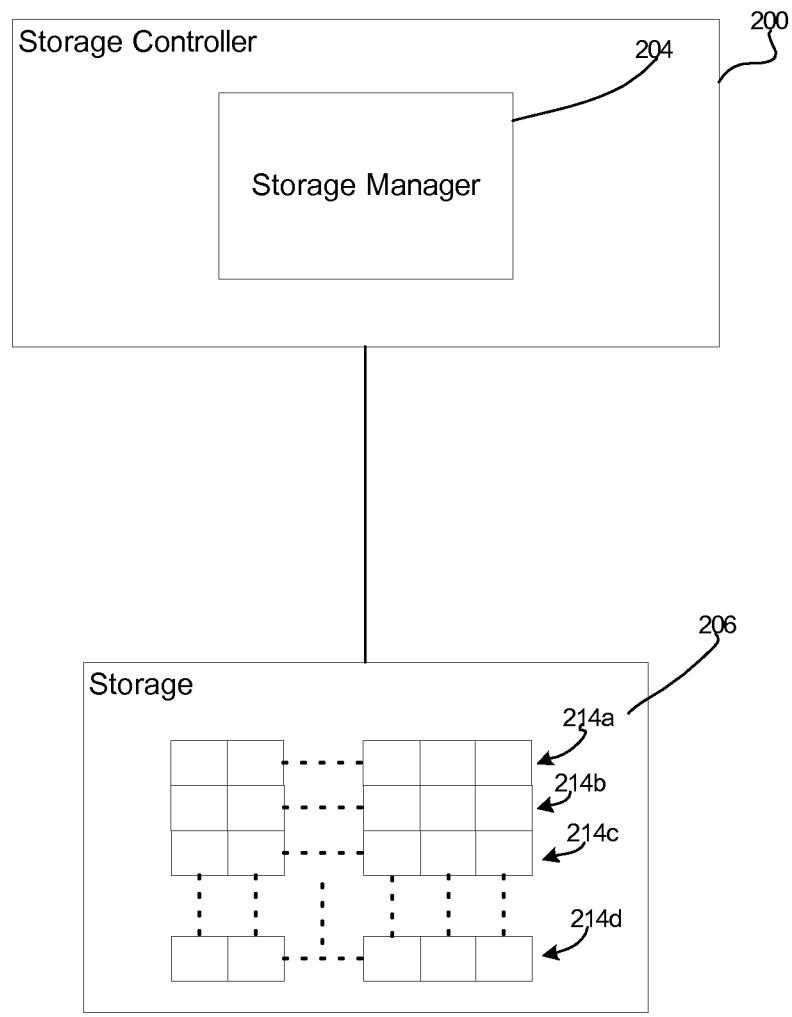
FIG. 2 illustrates a more specific embodiment of a computing environment in which an aspect of the present description may be employed in a RAID storage apparatus.
FIG. 3 depicts the prior art Exclusive-OR function.

FIG. 2 illustrates an embodiment of a computing environment in which a secret-sharing transformation architecture in accordance with the present description may be implemented. For example, a RAID storage controller 200 includes a storage manager 204 comprising software and/or hardware to manage read and write requests to data in a storage 206. The storage manager maintains information in a memory indicating all the active addressable blocks in the storage 206, such as tracks or logical block addresses (LBAs). The storage manager 204 may be implemented in a logical partition of a processing complex of the RAID storage controller 200 and may perform error checking on the addressable blocks. It is appreciated that the storage manager 204 may be implemented in a processor which lacks multiple processing complexes or logical partitions, depending upon the particular application.

The storage 206 may comprise one or more storage devices, such as one or more disk drives, an array of storage devices, such as a Just a Bunch of Disks (JBOD), Direct Access Storage Device (DASD), Redundant Array of Independent Disks (RAID) array, virtualization device, tape storage, flash memory, etc. Data or checksum blocks written to each disk in a RAID rank for an addressable location, such as an LBA or track, are referred to as a stripe, where a stripe comprises the consecutive sectors written to a single disk in a rank of storage devices across which data and checksum information are written.

Data in each addressable block in the storage 206 is stored in stripes 214a, 214b, 214c, 214d. The stripes 214a, 214b, 214c, 214d also include checksum blocks calculated using suitable error correction calculation techniques such as a redundancy check code, cyclical redundancy check (CRC) code, parity code, or other checksum values known in the art.

In one embodiment, the data in a stripe 214a, 214b, 214c, 214d is stored in a separate storage unit, e.g., a hard disk drive, such a that there are n storage units for storing data and one or more storage units for storing checksum. Redundant Array of Independent Disk (RAID) algorithms known in the art may be used to write stripes 214a, 214b, 214c, 214d of data and checksum to the storage 206. In this way, the data from one addressable block, e.g., track, LBA, etc., is stored across multiple disks to enable data recovery in the event of a failure and increased data throughput to improve read and write performance.

The RAID storage controller 200 may comprise a separate storage server in communication with multiple host systems, having one or more processors. Alternatively, the RAID storage controller 200 may be implemented on an expansion card or the motherboard of a computer system. The combination of the RAID storage controller 200 and storage manager 204 may be implemented as a processor executing computer readable code and/or a hardware device implementing hardware logic to perform the described operations.

As explained in greater detail below, in accordance with one aspect of the present description, data storage apparatus and methods are provided which can ensure that the data stored in an array of storage elements cannot be interpreted if only one element in the array is obtained. In one embodiment, secret-sharing transformation is based upon the Exclusive-Or function referred to herein as "x-or." The Exclusive-Or function for two variables, A and B, is depicted in table 300 of FIG. 3. As shown therein, A (x-or) B=0 if both A and B are=0 or if both A and B are =1. Alternatively, A (x-or) B=1 if one but not both of A and B=1. In accordance with the present description, it is believed that any bit of information (for example an input bit "X") can be split into two elements, for example, a secret-sharing bit "A" and a secret-sharing bit "B" such that X=A (x-or) B. Input bit "X" split in such a manner can be split into one of two different sets of secret-sharing transformation values: AB="00" or "11" for X="0"; or AB="01" or "10" for X="1". One of the two different sets of secret-sharing transformation values may be selected randomly.

Thus, a randomization function may be used to determine which set of values is used for secret-sharing bits AB to transform for secret-sharing input bit X. The secret-sharing bits AB may then be written to storage instead of the input bit X. Any subsequent read operation to determine input bit X would involve reading both secret-sharing bits A and B in order to compute input bit X. In other words, if it is determined that secret-sharing bit A="1", but secret-sharing bit B remains unknown, then input bit X could be either "0" or "1". Without the value of secret-sharing bit B, the value of input bit X cannot be computed based on the value of secret-sharing bit A alone. On the other hand, if it is determined both that secret-sharing bit A="1", and that secret-sharing bit B="0", then the value of input bit X may be readily determined, that is, by Exclusive-Or'ing bits A and B together to compute that input bit X="1".

Figure 4A:
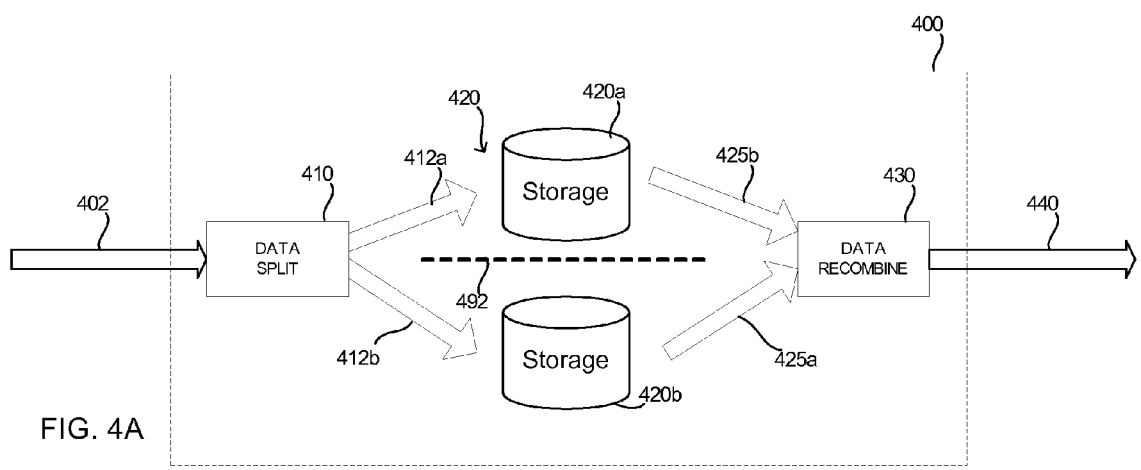
FIG. 4A illustrates an embodiment of operations in a storage system in which data is transformed for secret-sharing to facilitate maintenance of confidentiality.

It is believed that secret-sharing transformation of data by splitting each bit of input data, on a bit by bit basis, into two secret-sharing transformation elements, may be applied to a variety of applications. For example, FIG. 4A depicts an application of a storage system 400 in which a stream 402 of input data to be stored, is split by a data splitter 410 into multiple streams 412a, 412b, and the multiple streams are stored in an array 420 of storage elements, such as disks 420a, 420b, for example. Thus, in this example, an input bit X of the input stream 402 may be split by the data splitter 410, into two elements, a secret-sharing bit A and a secret-sharing bit B, in which the secret-sharing bit A is written to and stored on disk 420a whereas the secret-sharing bit B is written to and stored on disk 420b. If one of the disks 420a, 420b were stolen or otherwise subjected to an unauthorized read operation, input bit X which is represented by both secret-sharing bits A and B stored in both disks 420a, 420b, respectively could not be interpreted from secret-sharing bit A (or secret-sharing bit B) alone. However, if secret-sharing bits A and B are both read from disks 420a, 420b, respectively, in secret-sharing bit streams 425a, 425b, respectively, the secret-sharing bits A and B may be recombined (e.g. Exclusive-Or'd) together by a data stream recombine 430 to compute the value of input bit X to provide an output stream 440 of data which includes the input bit X.

Figure 4B:
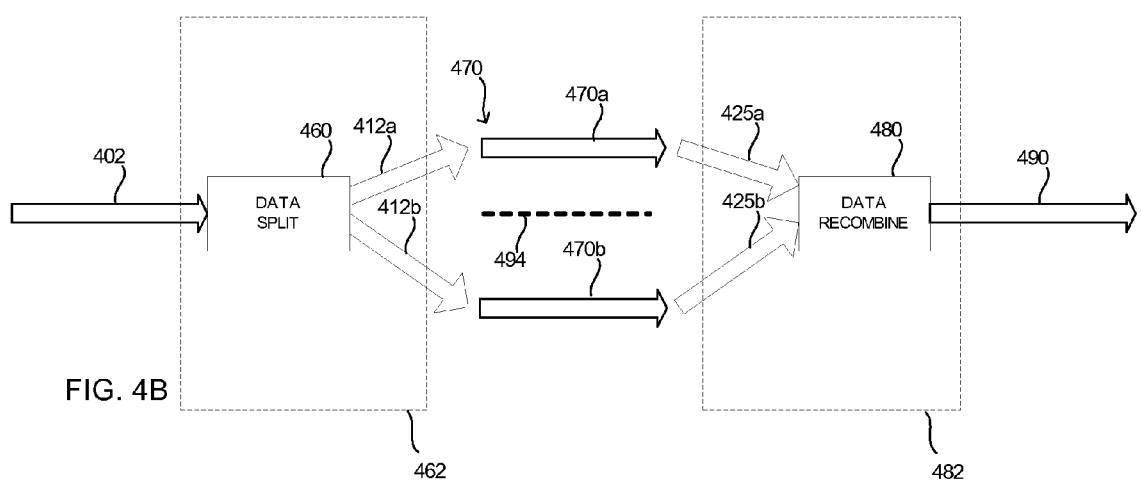
FIG. 4B illustrates an embodiment of operations in a communication systems system in which data is transformed for secret-sharing to facilitate maintenance of confidentiality.

As another example, FIG. 4B depicts an application of a transmission system 445 in which a stream 402 of input data to be transmitted, is split by a data splitter 460 of a transmission unit 462, into multiple streams 412a, 412b, and transmitted by an array 470 of transmission channels, such as channels 470a, 470b, for example. Thus, in this example, an input bit X of the input stream 450 may be split by the data splitter 460, into two elements, a secret-sharing bit A and a secret-sharing bit B, in which the secret-sharing bit A is transmitted on channel 470a whereas the secret-sharing bit B is transmitted on the channel 470b. If the data transmission of one the channels 470a, 470b was intercepted or otherwise subjected to an unauthorized read operation, input bit X which is represented by both secret-sharing bits A and B transmitted in both channels 470a, 470b, respectively could not be interpreted from secret-sharing bit A (or secret-sharing bit B) alone. However, if both secret-sharing bits A and B are received from transmission channels 470a, 470b, respectively, the secret-sharing bits A and B may be recombined (e.g. Exclusive-Or'd) together by a data stream recombine 480 of a receiver unit 482 to compute the value of input bit X to provide an output stream 490 of data which includes the input bit X.

In the illustrated embodiment, the data splitter 410, 460 and the data recombine 430, 480 may be implemented in one or more processing units using standard programming and/or engineering techniques to produce software, firmware, hardware, or any combination thereof, including but not limited to programmed microprocessors, integrated circuits, etc. The storage drives 420a, 420b may be separated as represented by a dividing line 492. Such separation may take the form of being located in different machines, different rooms of a building, different geographical locations etc to facilitate avoiding the occurrence of both drives 420a, 420b being accessed by unauthorized personnel. The transmission channels 470a, 470b may be similarly separated as represented by a dividing line 494.

It is believed that any set of input data of length N may be secret-sharing transformed into a Secret-sharing Transformation Data Set of as few as N+1 bits of secret-sharing transformation data. The Secret-sharing Transformation Data Set of N+1 bits of data may then be split into two or more subsets of data, any one of which alone would not allow any of the original data sets to be reconstructed.

For example, a set of input data which comprises two input bits, X and Y, has a length N=2. It is believed that the set XY of data of length 2 may be secret-sharing transformed into a Secret-sharing Transformation Data Set of as few as 2+1=3 bits of secret-sharing transformation data. An example has been shown above of how input bit 'X' may be split into one of two different sets of secret-sharing transformation elements: AB="00" or "11" for X="0"; or AB="01" or "10" for X="1". One of the two different sets of secret-sharing transformation values may be selected randomly.

The next input bit Y of the input set XY may also be split into a pair of elements, secret-sharing bit E and secret-sharing bit F. Thus, the input bit 'Y' may be split into one of two different sets of values: EF="00" or "11" for Y="0"; or EF="01" or "10" for Y="1". However, it is recognized both secret-sharing bit pair values (AB="00" or "11" for X="1"; or AB="01" or "10" for X="0") starts with either a 0 or 1. Similarly, secret-sharing bit pair EF can be represented as two different sets of values (for Y=0 (or Y=1)) and both sets start with either a 0 or 1. As a result, it is recognized that the secret-sharing bit representation for Y can be chosen to ensure E=B. As a consequence, the pairs of secret-sharing bits representing inputs bits X and Y, respectively, can share a secret-sharing bit, here secret-sharing bit B. Thus the set of secret-sharing transformed bits to represent input bits XY could be as few as three secret-sharing bits ABF. Consequently, input bit X can be derived from the pair of secret-sharing bits AB, input bit Y can be derived from the pair of secret-sharing bits BF, and neither the value of input bit X nor the value of input bit Y can be identified from just one secret-sharing bit of the Secret-sharing transformed Data Set of the secret-sharing bits ABF.

Figure 5:
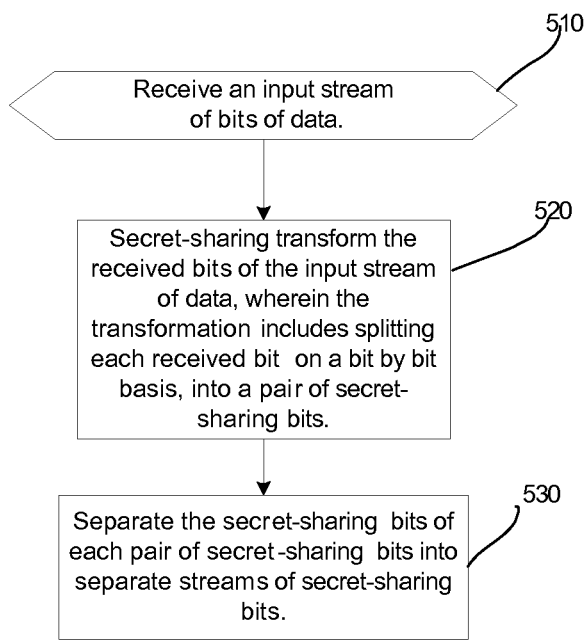
FIG. 5 illustrates an embodiment of operations to transform for secret-sharing an input stream of bits in accordance with one aspect of the present description.
Figure 6A:
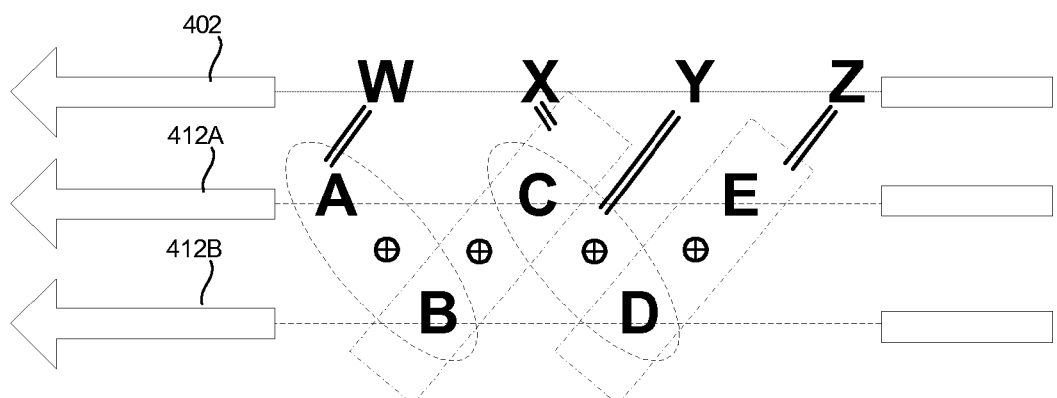
FIGS. 6A and 6B illustrate a more detailed example of operations to transform for secret-sharing an input stream of bits in accordance with an aspect of the present description.
Figure 6B:
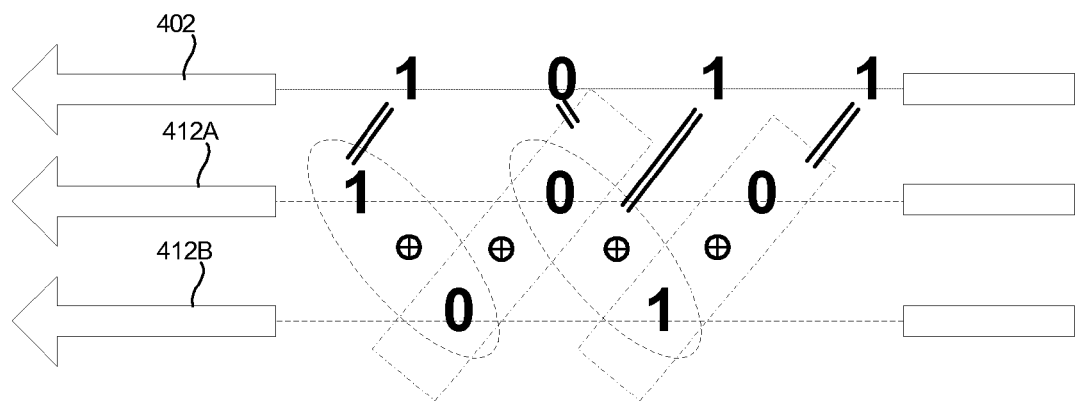

FIG. 5 depicts one example of operations for secret-sharing transformation of a stream of input data in accordance with one embodiment of the present description. In a first operation, an input stream of bits of data is received (block 510). FIGS. 6A, 6B depict an example of a stream 402 of input data which includes a set of input bits WXYZ. In another operation, the received bits of the input stream of data are secret-sharing transformed (block 520, FIG. 5) on a bit by bit basis. In this example, the secret-sharing transformation includes splitting each bit of the received bits of the input stream of data into a pair of secret-sharing bits, on a bit by bit basis. Thus, a complete set of input data is not needed to compute the secret-sharing bits. Instead, upon receipt of an input bit, the corresponding pair of secret-sharing bits may be readily computed.

FIGS. 6A and 6B depict the set of input bits WXYZ being secret-sharing transformed into a Secret-sharing Transformation Data Set which includes secret-sharing bits ABCDE. Input bits W, X, Y, Z are represented and may be computed from secret-sharing bit pairs AB, BC, CD, DE, respectively. Thus, in this example, W=A (x-or) B; X=B (x-or) C; Y=C (x-or) D; and Z=D (x-or) E as shown in FIG. 6A.

In another operation, the secret-sharing bits of each pair of secret-sharing bits are separated (block 530, FIG. 5) into separate streams of secret-sharing bits. In the example of FIGS. 6A, 6B, the secret-sharing bit pairs AB, BC, CD, DE are separated into one stream 412a of secret-sharing bits which includes secret-sharing bits ACE, and another stream 412b of secret-sharing bits which includes secret-sharing bits BD. In the illustrated embodiment "adjacent" secret-sharing bits of the Secret-sharing Transformation Data Set form pairs of secret-sharing bits in which each pair is used to reconstruct an input bit. Thus, the placement of secret-sharing bits of the Secret-sharing Transformation Data Set ABCDE into one stream 412a of secret-sharing bits which includes secret-sharing bits ACE, and another stream 412b of secret-sharing bits which includes secret-sharing bits BD, is preferably performed in a manner in which no two "adjacent" items of secret-sharing transformed data are placed in the same stream. Since the secret-sharing bits AB, for example, are "adjacent" in the Secret-sharing Transformation Data Set ABCDE, and form a pair of secret-sharing bits split from an input bit, it is preferred that the pair of secret-sharing bits AB be separated into different streams. Similarly, it is preferred that the pair of adjacent secret-sharing bits BC be separated into different streams, etc. Thus, none of the secret-sharing bits ACE of the stream 412a is adjacent to the other in the Secret-sharing Transformation Data Set ABCDE, and none of the secret-sharing bits BD of the stream 412b is adjacent to the other in the Secret-sharing Transformation Data Set ABCDE.

The streams 412a, 412b of secret-sharing bits may be stored separately on separate storage devices 420a, 420b, as depicted in FIG. 4A, or may be transmitted separately through separate transmission channels 470a, 470b, as depicted in FIG. 4B, to preserve confidentiality of the input data stream 402. Thus, if one of the storage devices or transmission channels containing secret-sharing bit stream 412a, for example, is compromised, none of the bits of the input data stream 402 can be reconstructed without the other storage device or transmission channel containing the other secret-sharing bit stream 412b, for example. It is appreciated that the secret-sharing bits may be separated into more than two streams and may be transmitted in more than two channels or may be stored in on more than two storage devices. Thus, input data of length N may be secret-sharing transformed into a Secret-sharing Transformation Data Set of as few as N+1 bits of secret-sharing transformation data, and stored on up to N+1 storage devices, for example. However, again, it is preferred that no two adjacent secret-sharing bits of the Secret-sharing Transformation Data Set be placed in the same stream or stored in the same storage device or transmitted in the same transmission channel. Thus, it is preferred that the secret-sharing bits which form a pair of secret-sharing bits split from an input bit, be separated into different streams, stored on different storage or transmitted in different channels.

Figure 7:
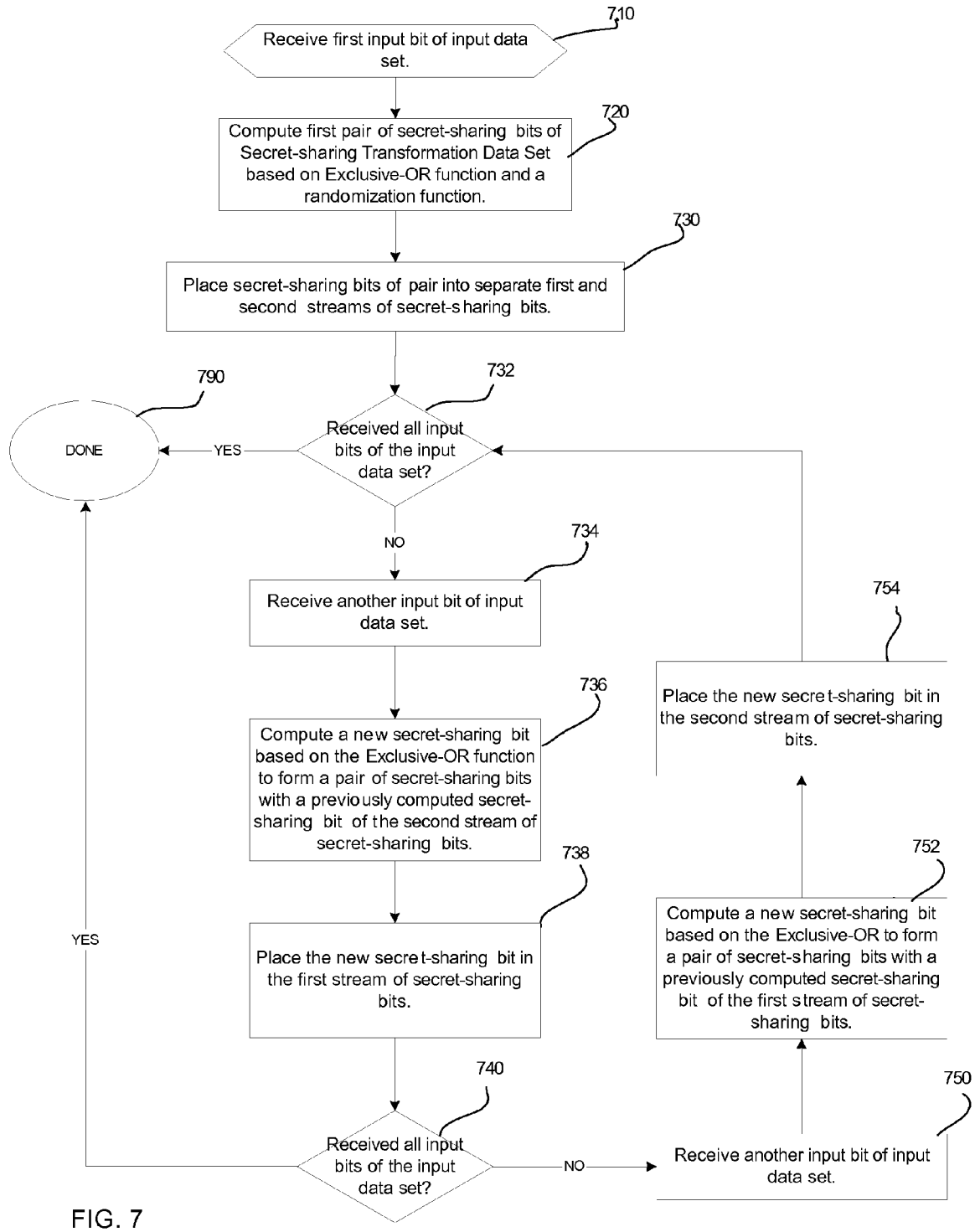
FIG. 7 illustrates a more detailed example of operations to transform for secret-sharing an input stream of bits on a bit by bit, iterative, basis, in accordance with an aspect of the present description.

FIG. 7 depicts a more detailed example of secret-sharing transformation of input data, on a bit by bit basis, into pairs of secret-sharing bits which are then placed into separate streams of secret-sharing bits. In one operation, a first input bit of an input data set is received (block 710). Referring to the example of FIGS. 6A, 6B, the first input bit of the set WXYZ of input bits of the input stream 500 to be secret-sharing transformed is input bit W.

In another operation, a first pair of secret-sharing bits of the Secret-sharing Transformation Data Set may be computed (block 720, FIG. 7) based on Exclusive-OR function and a randomization function. It is seen from the above, that the input bit W can be split into a pair of elements, for example, secret-sharing bit "A" and secret-sharing bit "B" such that W=A (x-or) B. Input bit "W" split in such a manner can be split into one of two different pairs of values: AB="00" or "11" for W="1"; or AB="01" or "10" for W="0". One of the two different pairs of values may be selected randomly utilizing a randomization function. In this example, the input bits WXYZ have values of 1011, for example, as shown in FIG. 6B. Thus if input bit W=1, the secret-sharing bits AB may be selected at random to have values of 10 (instead of 01) for example, to satisfy the condition that W=A (x-or) B, or 1=1 (x-or) 0.

In another operation, the secret-sharing bits of the computed pair are placed (block 730, FIG. 7) into separate first and second streams of secret-sharing bits. In the example of FIGS. 6A, 6B, the secret-sharing bits A and B (representing input bit W) are placed into secret-sharing transformation streams 412a, 412b, respectively. Although two streams of secret-sharing bits are depicted for simplicity sake, it is appreciated that the pairs of secret-sharing bits may be distributed over a number of streams which may number more than 2, depending upon the particular application. Again, it is preferred that no two adjacent secret-sharing bits of the Secret-sharing Transformation Data Set be placed in the same stream or stored in the same storage device or transmitted in the same transmission channel.

If all input bits for generating the Secret-sharing Transformation Data Set have not been received (block 732), another input bit of the input data set is received (block 734). In the example of FIGS. 6A, 6B, the next input bit is input bit X of the input set WXYZ.

A new secret-sharing bit based on the Exclusive-OR function may be computed (block 736) to form a pair of secret-sharing bits, in which one bit of the pair is a previously computed secret-sharing bit of the second stream of secret-sharing bits.

In the example of FIGS. 6A, 6B, the input bit X can be split into a pair of elements, for example, secret-sharing bit "B" and secret-sharing bit "C" such that X=B (x-or) C. As previously noted, input bit W having a value of 1 may be split into the pair of secret-sharing bits AB (FIG. 6A) having the value 10 (FIG. 6B), for example. Thus, if, the value of the secret-sharing bit B=0 and, if input bit X=0, for example, the value of secret-sharing bit C of the secret-sharing bit pair BC may be computed as C=0 to satisfy the condition that input bit X=B (x-or) C. In this manner, a new secret-sharing bit (secret-sharing bit C) is computed based on the Exclusive-OR function to form a pair BC of secret-sharing bits with a previously computed secret-sharing bit B of the second stream 412b of secret-sharing bits. The newly computed secret-sharing bit C may be placed (block 738) in one of the streams of secret-sharing bits. Since the secret-sharing bit B of the pair BC has been placed in the second stream 412b of secret-sharing bits as shown in FIGS. 6A, 6B, the secret-sharing bit C may be placed in a different stream of secret-sharing bits, such as the first stream 412a as depicted in FIGS. 6A, 6B.

The remaining pairs of secret-sharing bits for each input bit of the input set may be iteratively computed and placed into streams of secret-sharing bits in a similar manner. Accordingly, if all input bits for generating the Secret-sharing Transformation Data Set have not been received (block 740), another input bit of the input data set is received (block 750). In the example of FIGS. 6A, 6B, the next input bit is input bit Y of the input set WXYZ.

A new secret-sharing bit based on the Exclusive-OR function may be computed (block 752) to form a pair of secret-sharing bits, in which one bit of the pair is a previously computed secret-sharing bit of the first stream of secret-sharing bits. In the example of FIGS. 6A, 6B, the input bit Y can be split into a pair of elements, for example, secret-sharing bit "C" and secret-sharing bit "D" such that Y=C (x-or) D. Thus, if, the value of secret-sharing bit C has already been computed as C=0 (as set forth in the above example) and, if input bit Y=1, for example, secret-sharing bit D of the secret-sharing bit pair CD may be computed as D=1 to satisfy the condition that input bit Y=C (x-or) D. In this manner, a new secret-sharing bit (secret-sharing bit D) is computed based on the Exclusive-OR function to form a pair CD of secret-sharing bits using the previously computed secret-sharing bit C of the first stream 412a of secret-sharing bits. The newly computed secret-sharing bit D may be placed (block 754) in one of the streams of secret-sharing bits. Since the secret-sharing bit C of the pair CD has been placed in the first stream 412a of secret-sharing bits as shown in FIGS. 6A, 6B, the secret-sharing bit D may be placed in a different stream of secret-sharing bits, such as the second stream 412b as depicted in FIGS. 6A, 6B.

The remaining pairs of secret-sharing bits for each input bit of the input set may be iteratively computed and placed into streams of secret-sharing bits in a similar manner. Accordingly, if all input bits for generating the Secret-sharing Transformation Data Set have not been received (block 732), another input bit of the input data set is received (block 734). In the example of FIGS. 6A, 6B, the next input bit is input bit Z of the input set WXYZ.

A new secret-sharing bit based on the Exclusive-OR function may be computed (block 736) to form a pair of secret-sharing bits, in which one bit of the pair is a previously computed secret-sharing bit of the second stream of secret-sharing bits. In the example of FIGS. 6A, 6B, the input bit Z can be split into a pair of elements, for example, secret-sharing bit "D" and secret-sharing bit "E" such that Z=D (x-or) E. Thus, if, the value of secret-sharing bit D has already been computed as D=1 (as set forth in the above example) and, if input bit Z=1, for example, secret-sharing bit E of the secret-sharing bit pair DE may be computed as E=0 to satisfy the condition that input bit Z=D (x-or) E. In this manner, a new secret-sharing bit (secret-sharing bit E) is computed based on the Exclusive-OR function to form a pair DE of secret-sharing bits using a previously computed secret-sharing bit D of the second stream 412b of secret-sharing bits. The newly computed secret-sharing bit E may be placed (block 738) in one of the streams of secret-sharing bits. Since the secret-sharing bit D of the pair DE has been placed in the second stream 412b of secret-sharing bits as shown in FIGS. 6A, 6B, the secret-sharing bit E may be placed in a different stream of secret-sharing bits, such as the first stream 412a as depicted in FIGS. 6A, 6B. If it is determined (block 740) that no more data is to be secret-sharing transformed, the process is done (block 790).

In this manner, the input bits WXYZ (FIG. 6A) having values 1011 (FIG. 6B) for example, may be iteratively computed on a bit by bit basis to generate the Secret-sharing Transformation Data Set ABCDE (FIG. 6A) having values 10010 (FIG. 6B), for example, where W=A (x-or) B, X=B (x-or) C, Y=C (x-or) D, and Z=D (x-or) E. Furthermore, the secret-sharing bits ACE may be placed in a first stream 412a of secret-sharing bits and the secret-sharing bits BD may be placed in a second stream 412b of secret-sharing bits so that no two secret-sharing bits of any one pair of secret-sharing bits defining an input bit are placed into the same stream. As a result, no two adjacent secret-sharing bits of the Secret-sharing Transformation Data Set are placed in the same stream or stored in the same storage device or transmitted in the same transmission channel.

As noted above, in the illustrated embodiment, the first pair of secret-sharing bits may be selected from one of two possible sets of secret-sharing bits using a randomization function, as a Boolean randomization, for example. If only one randomization is performed per data set being written, it is appreciated that there would be two possible secret-sharing transformed data sets for a given starting data set. The two possible secret-sharing transformed data sets are inverses of each other in the illustrated embodiment. Thus, in the above example, the input data set 1011 was secret-sharing transformed to the Secret-sharing Transformation Data Set 10010 (FIG. 6B). If the other possible set of secret-sharing bits were selected for the first pair of secret-sharing bits as a result of the randomization function, the input data set 1011 would have been secret-sharing transformed to the Secret-sharing Transformation Data Set 01101, the inverse of the secret-sharing transformed data set 10010. It is believed that any sized input data set can be secret-sharing transformed in this manner.

As set forth above, it is believed that an input data set of N bits may be secret-sharing transformed in accordance with the present description to a Secret-sharing Transformation Data Set of as few as N+1 bits. Accordingly, when writing the secret-sharing bits to storage, the space required for the secret-sharing bits need not exceed N+1 bits for an input data set of N bits. It is appreciated however, that additional bits may be added for mirroring, parity, error correction, private key encryption etc.

Also, a pair of secret-sharing bits may be computed as each input bit is received, on an input bit by input bit basis. In one application, the computation of each pair of secret sharing bits for a particular input bit is not a function of subsequent bits of the input data set. Thus, the subsequent input bits of the eventual input set need not be known in order to compute a pair of secret-sharing bits for a particular input bit. It is appreciated that in other applications, a secret-sharing transformation may be based upon subsequent input bits as well.

Once an input data set is written to storage in the form of a Secret-sharing Transformation Data Set, it is appreciated that subsequent write operations to any part of the to the Secret-sharing Transformation Data Set may result in additional portions of the to the Secret-sharing Transformation Data Set being recomputed and written to storage. For example, in one embodiment, all secret-sharing bits from the point of the update to the end of the Secret-sharing Transformation Data Set may need to be rewritten, thus causing a write overhead. Alternatively, all secret-sharing bits from the point of the update back to the beginning of the Secret-sharing Transformation Data Set may need to be rewritten. A worse case scenario is that the middle bit is updated and half the data needs to be rewritten. In a preferred embodiment, any write to the data set should randomly result in the entire secret-sharing transformed data set to be re-randomized, recalculated, and rewritten. Thus when one bit of data is written in the set, all N+1 data bits in the secret-sharing transformed set may be rewritten. Any bits created by redundancy algorithms such as parity or mirroring may also need to be rewritten.

Figure 8:
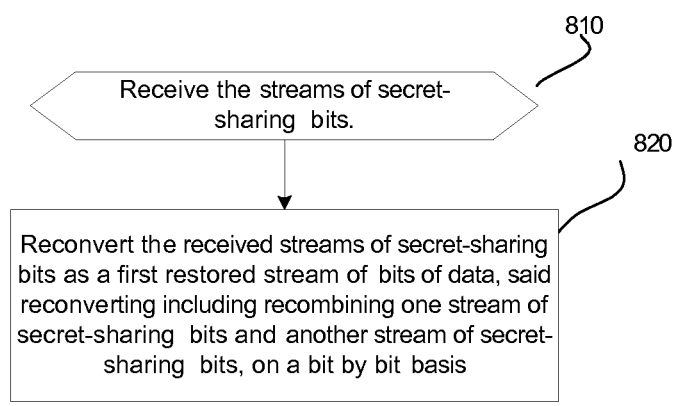
FIG. 8 illustrates an embodiment of operations to reconvert streams of secret-sharing bits in accordance with one aspect of the present description.

FIG. 8 depicts one example of operations to reconvert a set of secret-sharing bits to restore the input data set from which the secret-sharing bits were created. In a first operation, streams of secret-sharing bits are received (block 810). In another operation, the received streams of secret-sharing bits are reconverted (block 820) as a restored stream of bits of data. In the illustrated embodiment, the reconverting operation includes recombining one stream of secret-sharing bits and another stream of secret-sharing bits, on a bit by bit basis. In the example of FIG. 4A, multiple secret-sharing bit streams 425a, 425b are received by a data recombine 430 which recombines each pair of secret-sharing bits to restore the input bits as an output stream 440. Similarly, in the example of FIG. 4B, multiple secret-sharing bit streams 425a, 425b are received by a receiver unit 482 and are recombined by a data recombine 480 which recombines each pair of secret-sharing bits to restore the input bits as an output stream 490.

FIG. 9 depicts a more detailed example of the reconversion process of FIG. 8 in which the original input data may be reconstructed from the secret-sharing transformation pairs. Upon initiation (block 910) of the reconversion, a pair of secret-sharing bits representing an input data bit to be reconstructed, is read (block 920). In the example of FIG. 4A, the location of the secret-sharing transformation pair in the storage 420a, 420b for a particular input data bit may be stored in unencrypted metadata, for example. Thus, to obtain the secret-sharing transformation pair CD of the Secret-sharing Transformed Data Set ABCDE, to restore the input bit Y of the input data set WXYZ of FIG. 6A, the locations of the secret-sharing bits C and D of the secret-sharing transformation pair CD may be looked up. The locations of the secret-sharing bits may be stored in a table, computed sequentially from a base address, or using other suitable methods. Upon obtaining the locations of the secret-sharing bits of the secret-sharing transformation pair CD, the values of the secret-sharing bits of the pair may be read.

The value of the original input bit may be restored or reconstructed by performing (block 930) an Exclusive-OR function on the values of the associated secret-sharing bit pair. Thus, in the example of the input bit Y, the value of the original input bit Y may be restored or reconstructed by performing an Exclusive-OR function on the values of the associated secret-sharing bit pair CD such that Y=C (x-or) D. If it is determined (block 940) that more data is to be reconstructed, the process obtains the next pair of secret-sharing bits representing the next input data bit to be reconstructed and the Exclusive-OR function is performed on the next pair of secret-sharing bits to restore the next input data bit as described above.

In this example, the next input bit to be restored is the input bit Z, which is the next bit of the input set WXYZ, and the associated secret-sharing transformation pair for the input bit Z is the pair DE. The secret-sharing bit pair DE is obtained by reading (block 950) secret-sharing bit E from storage. It is noted that secret-sharing bit D need not be read again if it has been retained from the prior reconversion process for input bit Y. The value of the original input bit Z may be restored or reconstructed by performing an Exclusive-OR function on the values of the associated secret-sharing bit pair DE such that Z=D (x-or) E. If it is determined (block 940) that no more data is to be reconstructed, the process is done (block 970). In this manner, the original input bits may be restored, on a bit by bit basis, using an iterative process.

In terms of read performance overhead, it is noted that, in the illustrated embodiment, the number of reads for any input bit may be as few as two, independent of the number of bits included in the Secret-sharing Transformation Data Set. As noted above, the placement of the Secret-sharing Transformation Data Set is preferably performed in a manner in which no two adjacent items of secret-sharing transformed data are placed on the same drive or in the same transmission channel, for example. Thus if a drive is lost, it is believed that no data may be regenerated from the information stored on the one disk. Thus, in one embodiment, it is preferred that the secret-sharing transformed data bits are distributed over at least two disk drives or other storage media, or over at least two transmission channels or other transmission media. The data sets may be alternated between them. In the example given above, disk 1 would have data A,C,E and disk 2 would have data B,D of the Secret-sharing Transformation Data Set ABCDE.

In alternative embodiments, Secret-sharing Transformation Data sets may be further split between two ranks (disk sets) so that if any rank is lost, no data would be removable from it. This would be accomplished by alternating the data set between them (rank 1 would have data A,C,E and rank 2 would have data B,D). In another alternative embodiment, the data of a Secret-sharing Transformation Data Set may be alternated between different machines as well so that information from one machine is not sufficient to reconstruct the data.

The above described secret-sharing transformation and reconversion operations do not include redundancy algorithms to ensure data can be rebuilt if one or more disks are unexpectedly lost from the array. In the example given above, if any one secret-sharing bit of data is lost from the Secret-sharing Transformation Data Set, two bits of input information may be effectively lost in the original input data set. It is appreciated that various redundancy schemes including RAID may be implement to guard against data loss. For example, in a RAID5 application, a parity bit can be included for each Secret-sharing transformed Data set and placed on a drive which may be a drive not containing any of the other data for that Secret-sharing Transformation Data Set for example. Thus, in one application, each bit of the secret-sharing transformation data set may be placed on separate drives, such that if one drive is lost, the data from the surviving drives may be used to reconstruct the lost bit on the lost drive.

In another embodiment, read characteristics may be enhanced by various data distribution techniques. It is noted that in the example given above, that the first and last bit of a Secret-sharing Transformation Data Set may be read and written the least, as all other bits in the array represent one half of two pieces of data, but the first and last only represent one half of one piece. To reduce read imbalance, the particular data bits may be rotated amongst the drives. For example, in a 4 drive system, with 4 bits per stripe (ABCD), the first disk would have (A1, B2, C3, D4), the second disk would have (A2, B3, C4, D1), the third would have (A3, B4, C1, D2), the fourth would have (A4, B1, C2, D3), and so on. Thus the first and last bits, A and D, would be on different disks for different data sets.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented as hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable storage medium at the receiving and transmitting stations or devices. An "article of manufacture" comprises computer readable storage medium, hardware logic, and/or transmission signals in which code may be implemented. A device in which the code implementing the described embodiments of operations is encoded may comprise a computer readable storage medium, computer readable transmission medium or hardware logic. Of course, those skilled in the art will recognize that many modifications may be made to this configuration without departing from the scope of the present invention, and that the article of manufacture may comprise suitable information bearing medium known in the art.

In the described embodiments, RAID algorithms are used to write user data and checksum data to storage. In an alternative embodiment, different storage algorithms may be used to write user and checksum data to storage in different arrangements than shown in FIG. 2.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4A-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving an input stream of bits of data;
   secret-sharing transforming the received bits of the input stream of data, said secret-sharing transforming including splitting each received bit of the bits of the input stream of data, on a bit by bit basis, into a pair of secret-sharing bits; and
   separating the secret-sharing bits of each pair of secret-sharing bits into separate streams of secret-sharing bits so that one secret-sharing bit of each pair of secret-sharing bits is in one stream of secret-sharing bits and the other secret-sharing bit of each pair is in another stream of secret-sharing bits different from the one stream of secret-sharing bits and wherein a secret sharing bit is shared by adjacent pairs of secret sharing bits;
   wherein the splitting is a function of the exclusive-OR function such that a first received bit of the input stream of bits is equal to the exclusive-OR function of a first associated pair of secret-sharing bits, one secret-sharing bit being in the one stream of secret-sharing bits, and the other secret-sharing bit of the first associated pair being in the other stream of secret-sharing bits, and a second received bit of the input stream of bits is equal to the exclusive-OR function of a second associated pair of secret-sharing bits, one secret-sharing bit of the second associated pair being in the one stream of secret-sharing bits of data, and the other secret-sharing bit of the second associated pair being in the other stream of secret-sharing bits, and wherein one bit is shared between the first associated pair of secret-sharing bits and the second associated pair of secret-sharing bits so that the total number of secret-sharing bits of the first and second associated pairs of secret-sharing bits is three secret-sharing bits and wherein the separating of the three secret-sharing bits of the first and second associated pairs of secret-sharing bits, includes placing the shared secret-sharing bit in one stream of secret-sharing bits, and placing the other two secret-sharing bits of the three secret-sharing bits in one or more streams of secret-sharing bits different from the one stream of the shared secret-sharing bit; and
   wherein the input stream of bits has N bits, and wherein the splitting of each received bit of the N bits of the input stream of data, on a bit by bit basis, into a pair of secret-sharing bits, is performed iteratively, to generate a total of N+1 secret-sharing bits from the input stream of bits N bits.

2. The method of claim 1, wherein the separating the streams of secret-sharing bits includes:
   storing the plurality of streams of secret-sharing bits of data on separate storage media at separate locations so that the secret sharing bits of each of said pairs of secret sharing bits are stored on different storage media at different locations.

3. The method of claim 1, wherein the separating the streams of secret-sharing bits includes:
   transmitting the plurality of streams of secret-sharing bits of data in separate communication channels so that the secret sharing bits of each of said pairs of secret sharing bits are transmitted in different transmission channels.

4. The method of claim 1 wherein each received bit of the input stream of bits of data is equal to the exclusive-OR function of the associated pair of secret-sharing bits.

5. The method of claim 1 further comprising:
   receiving the streams of secret-sharing bits; and
   reconverting the received streams of secret-sharing bits as a first restored stream of bits of data, said reconverting including recombining the one stream of secret-sharing bits and the other stream of secret-sharing bits of data, on a bit by bit basis, wherein each recombined bit of the restored stream of bits of data is equal to the exclusive-OR function of an associated pair of secret-sharing bits, one secret-sharing bit from the one stream of secret-sharing bits, and the other secret-sharing bit from the other stream of secret-sharing bits.

6. The method of claim 4 wherein a first received bit of the input stream of bits of data has a value of 0 and wherein said splitting includes assigning either the values 0, 0 to the associated pair of secret-sharing bits of the one and the other streams of secret-sharing bits, respectively, or the values 1, 1 to the associated pair of secret-sharing bits of the one and the other streams of secret-sharing bits, respectively, as a function of a randomization function.

7. The method of claim 4 wherein a first received bit of the input stream of bits of data has a value of 1 and wherein said splitting includes assigning either the values 0, 1 to the associated pair of secret-sharing bits of the one and the other streams of secret-sharing bits, respectively, or the values 1, 0 to the associated pair of secret-sharing bits of the one and the other streams of secret-sharing bits, respectively, as a function of a randomization function.

8. A computer program product comprising a non-transitory computer readable storage medium storing computer readable program code that, when executed on a processor of a computer, causes the computer to perform operations, comprising:
   receiving an input stream of bits of data;
   secret-sharing transforming the received bits of the input stream of data, said secret-sharing transforming including splitting each received bit of the bits of the input stream of data, on a bit by bit basis, into a pair of secret-sharing bits; and
   separating the secret-sharing bits of each pair of secret-sharing bits into a plurality of separate streams of secret-sharing bits so that one secret-sharing bit of each pair of secret-sharing bits is in one stream of secret-sharing bits and the other secret-sharing bit of each pair is in another stream of secret-sharing bits different from the one stream of secret-sharing bits and wherein a secret sharing bit is shared by adjacent pairs of secret sharing bits;
   wherein the splitting is a function of the exclusive-OR function such that a first received bit of the input stream of bits is equal to the exclusive-OR function of a first associated pair of secret-sharing bits, one secret-sharing bit being in the one stream of secret-sharing bits, and the other secret-sharing bit of the first associated pair being in the other stream of secret-sharing bits, and a second received bit of the input stream of bits is equal to the exclusive-OR function of a second associated pair of secret-sharing bits, one secret-sharing bit of the second associated pair being in the one stream of secret-sharing bits of data, and the other secret-sharing bit of the second associated pair being in the other stream of secret-sharing bits, and wherein one bit is shared between the first associated pair of secret-sharing bits and the second associated pair of secret-sharing bits so that the total number of secret-sharing bits of the first and second associated pairs of secret-sharing bits is three secret-sharing bits and wherein the separating of the three secret-sharing bits of the first and second associated pairs of secret-sharing bits, includes placing the shared secret-sharing bit in one stream of secret-sharing bits, and placing the other two secret-sharing bits of the three secret-sharing bits in one or more streams of secret-sharing bits different from the one stream of the shared secret-sharing bit; and
   wherein the input stream of bits has N bits, and wherein the splitting of each received bit of the N bits of the input stream of data, on a bit by bit basis, into a pair of secret-sharing bits, is performed iteratively, to generate a total of N+1 secret-sharing bits from the input stream of N bits.

9. The computer program product of claim 8, wherein the separating the streams of secret-sharing bits includes:
   storing the plurality of streams of secret-sharing bits of data on separate storage media at separate locations so that the secret sharing bits of each of said pairs of secret sharing bits are stored on different storage media at different locations.

10. The computer program product of claim 8, wherein the separating the streams of secret-sharing bits includes:
    transmitting the plurality of streams of secret-sharing bits of data in separate communication channels so that the secret sharing bits of each of said pairs of secret sharing bits are transmitted in different transmission channels.

11. The computer program product of claim 8 wherein each received bit of the input stream of bits of data is equal to the exclusive-OR function of the associated pair of secret-sharing bits.

12. The computer program product of claim 8 further comprising:
    receiving the streams of secret-sharing bits; and
    reconverting the received streams of secret-sharing bits as a first restored stream of bits of data, said reconverting including recombining the one stream of secret-sharing bits and the other stream of secret-sharing bits of data, on a bit by bit basis, wherein each recombined bit of the restored stream of bits of data is equal to the exclusive-OR function of an associated pair of secret-sharing bits, one secret-sharing bit from the one stream of secret-sharing bits, and the other secret-sharing bit from the other stream of secret-sharing bits.

13. The computer program product of claim 11 wherein a first received bit of the input stream of bits of data has a value of 0 and wherein said splitting includes assigning either the values 0, 0 to the associated pair of secret-sharing bits of the one and the other streams of secret-sharing bits, respectively, or the values 1, 1 to the associated pair of secret-sharing bits of the one and the other streams of secret-sharing bits, respectively, as a function of a randomization function.

14. The computer program product of claim 11 wherein a first received bit of the input stream of bits of data has a value of 1 and wherein said splitting includes assigning either the values 0, 1 to the associated pair of secret-sharing bits of the one and the other streams of secret-sharing bits, respectively, or the values 1, 0 to the associated pair of secret-sharing bits of the one and the other streams of secret-sharing bits, respectively, as a function of a randomization function.

15. A system, comprising:
    a processing unit having a data input configured to receive an input stream of bits of data, and adapted to transform for secret-sharing the received bits of the input stream of data, said processing unit including a data splitter adapted to split each received bit of the bits of the input stream of data, on a bit by bit basis, into a pair of secret-sharing bits, and a data separator adapted to separate the secret-sharing bits of each pair of secret-sharing bits into separate streams of secret-sharing bits so that one secret-sharing bit of each pair of secret-sharing bits is in one stream of secret-sharing bits and the other secret-sharing bit of each pair is in another stream of secret-sharing bits different from the one stream of secret-sharing bits and wherein a secret sharing bit is shared by adjacent pairs of secret sharing bits;

wherein the processing unit is adapted to perform an exclusive-OR function and wherein the splitting is a function of the exclusive-OR function such that a first received bit of the input stream of bits is equal to the exclusive-OR function of a first associated pair of secret-sharing bits, one secret-sharing bit being in the one stream of secret-sharing bits, and the other secret-sharing bit of the first associated pair being in the other stream of secret-sharing bits, and a second received bit of the input stream of bits is equal to the exclusive-OR function of a second associated pair of secret-sharing bits, one secret-sharing bit of the second associated pair being in the one stream of secret-sharing bits of data, and the other secret-sharing bit of the second associated pair being in the other stream of secret-sharing bits, and wherein one bit is shared between the first associated pair of secret-sharing bits and the second associated pair of secret-sharing bits so that the total number of secret-sharing bits of the first and second associated pairs of secret-sharing bits is three secret-sharing bits and wherein the separating of the three secret-sharing bits of the first and second associated pairs of secret-sharing bits, includes placing the shared secret-sharing bit in one stream of secret-sharing bits, and placing the other two secret-sharing bits of the three secret-sharing bits in one or more streams of secret-sharing bits different from the one stream of the shared secret-sharing bit; and wherein the input stream of bits has N bits, and wherein the splitting of each received bit of the N bits of the input stream of data, on a bit by bit basis, into a pair of secret-sharing bits, is performed iteratively, to generate a total of N+1 secret-sharing bits from the input stream of N bits.

16. The system of claim 15, further comprising:
a plurality of separate storage media at separate locations, wherein the processing unit separator is adapted to store the plurality of streams of secret-sharing bits of data on said separate storage media at separate locations so that the secret sharing bits of each of said pairs of secret sharing bits are stored on different storage media at different locations.

17. The system of claim 15 for use with a plurality of separate communication channels, the system further comprising a data transmission unit having said data input and said processing unit, wherein said processing unit separator is adapted to:
transmit the plurality of streams of secret-sharing bits of data in said separate communication channels so that the secret sharing bits of each of said pairs of secret sharing bits are transmitted in different transmission channels.

18. The system of claim 15 wherein the processing unit has a data input configured to receive the streams of secret-sharing bits, and is adapted to reconvert the received streams of secret-sharing bits as a first restored stream of bits of data, said processing unit include a data recombinor adapted to recombine the one stream of secret-sharing bits and the other stream of secret-sharing bits of data, on a bit by bit basis, wherein each recombined bit of the restored stream of bits of data is equal to the exclusive-OR function of an associated pair of secret-sharing bits, one secret-sharing bit from the one stream of secret-sharing bits, and the other secret-sharing bit from the other stream of secret-sharing bits.

\* \* \* \* \*